US011971216B1

(12) United States Patent
Lukhard et al.

(10) Patent No.: US 11,971,216 B1
(45) Date of Patent: Apr. 30, 2024

(54) RETORT WITH LOADING WINDOW

(71) Applicant: Rolls-Royce High Temperature Composites, Inc., Cypress, CA (US)

(72) Inventors: Kevin Lukhard, Cypress, CA (US); Timothy Western, Cypress, CA (US); Thomas Tran, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 0 days.

(21) Appl. No.: 17/561,152

(22) Filed: Dec. 23, 2021

(51) Int. Cl.
*F27B 5/02* (2006.01)
*F27B 5/12* (2006.01)
*F27D 5/00* (2006.01)

(52) U.S. Cl.
CPC .................. *F27B 5/02* (2013.01); *F27B 5/12* (2013.01); *F27D 5/0006* (2013.01)

(58) Field of Classification Search
CPC .......... F27D 5/00; F27D 5/006; F27D 5/0012; F27D 5/0031; C22B 19/12; C21D 1/74; C21D 1/78; C21D 9/0025; C10G 9/18; F27B 5/14; F27B 14/00; F27B 14/10; F27B 2014/102; F27B 5/12; F27B 5/02
See application file for complete search history.

(56) References Cited

U.S. PATENT DOCUMENTS 1,913,386 A * 6/1933 Hansen .................. C21D 9/663 432/198
2,040,261 A * 5/1936 Klouman ............. C21D 9/0025 432/261
3,112,919 A 12/1963 Gunow
3,198,503 A * 8/1965 Eichelberg ............... C21D 1/74 266/256
4,909,732 A 3/1990 Wingens
5,193,998 A 3/1993 Hack et al.
5,267,259 A 11/1993 Gillhaus et al.
5,413,132 A * 5/1995 Cronan ................... B08B 3/045 134/159
5,478,057 A 12/1995 Wilhelmi et al.
6,369,361 B2 4/2002 Saito et al.
6,383,297 B1 * 5/2002 Schmidt .................... C23C 8/10 148/287
7,008,210 B2 * 3/2006 Manabe .................... F27B 5/06 425/405.2

(Continued)

FOREIGN PATENT DOCUMENTS

CA 2363208 A1 * 5/2002 ............. B08B 3/045
CN 108728800 A1 11/2018

(Continued)

*Primary Examiner* — Gregory A Wilson
(74) *Attorney, Agent, or Firm* — Shumaker & Sieffert, P.A.

(57) ABSTRACT

In some examples, a multilevel retort assembly. The assembly includes a base defining a base perimeter; and a plurality of shells. Each shell has a diffuser plate support and a perimeter with a substantially similar shape as the base perimeter. The plurality of shells are stacked on each other, mechanically supported by the base, and surround an inner retort volume. The at least one shell of the plurality of shells defines a removable window. The assembly also includes a plurality of diffuser plates, each diffuser plate supported by a corresponding diffuser plate support of the plurality of diffuser plate supports.

19 Claims, 8 Drawing Sheets

(56) References Cited

U.S. PATENT DOCUMENTS

| | | | | |
|---|---|---|---|---|
| 7,687,024 | B2 * | 3/2010 | Bergman | B30B 11/001 419/25 |
| 8,137,470 | B2 | 3/2012 | Min et al. | |
| 8,388,895 | B2 * | 3/2013 | Jung | C01G 43/01 422/236 |
| 10,435,810 | B2 | 10/2019 | Loboda et al. | |
| 10,945,313 | B2 * | 3/2021 | Rathi | H05B 6/6447 |
| 11,072,032 | B2 * | 7/2021 | Winnicka | B23K 1/008 |
| 2004/0035366 | A1 | 2/2004 | Keum et al. | |
| 2010/0239878 | A1 * | 9/2010 | Nagata | H01F 7/02 427/127 |
| 2011/0115138 | A1 | 5/2011 | Sarres et al. | |
| 2019/0337071 | A1 * | 11/2019 | Winnicka | A47B 87/0223 |
| 2021/0037612 | A1 * | 2/2021 | Kwon | F27D 3/0024 |

FOREIGN PATENT DOCUMENTS

| | | | | | |
|---|---|---|---|---|---|
| CN | 112179067 | A | * | 1/2021 | F26B 21/001 |
| DE | 10157840 | C1 | | 10/2002 | |
| DE | 10338431 | A1 | | 3/2005 | |
| DE | 202008009980 | U1 | | 11/2008 | |
| EP | 0312909 | A1 | | 4/1989 | |
| EP | 0460484 | A2 | | 12/1991 | |
| EP | 0662519 | A1 | | 7/1994 | |
| EP | 2995894 | A1 | * | 3/2016 | F27B 5/02 |
| FR | 2509452 | A1 | | 1/1983 | |
| JP | 2015230152 | A | * | 12/2015 | |
| KR | 20140100649 | A | * | 8/2014 | |
| RU | 2012144879 | A | | 4/2014 | |
| TW | 201317374 | A1 | | 5/2013 | |
| WO | WO-2011117409 | A1 | * | 9/2011 | F27B 17/005 |
| WO | 2013005448 | A1 | | 1/2013 | |

* cited by examiner

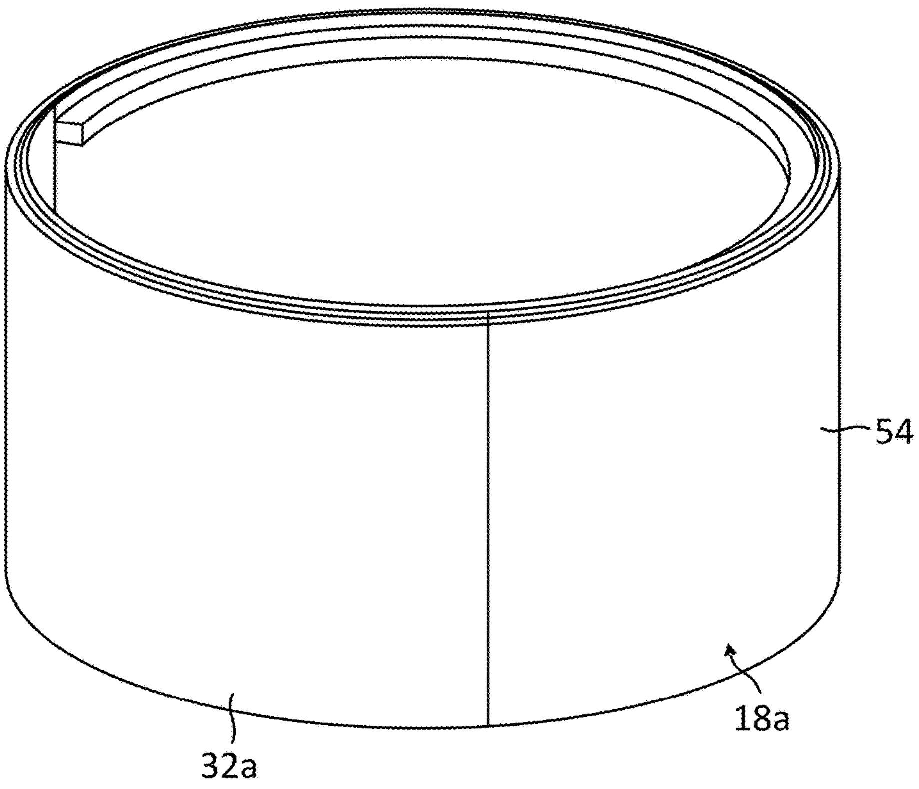
FIG. 5A
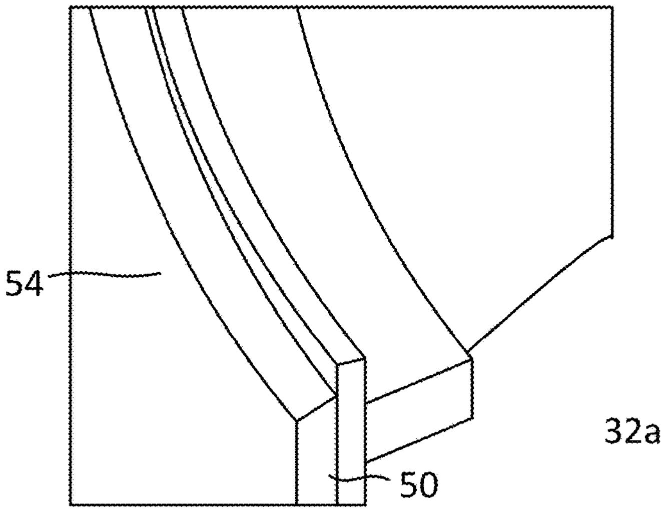
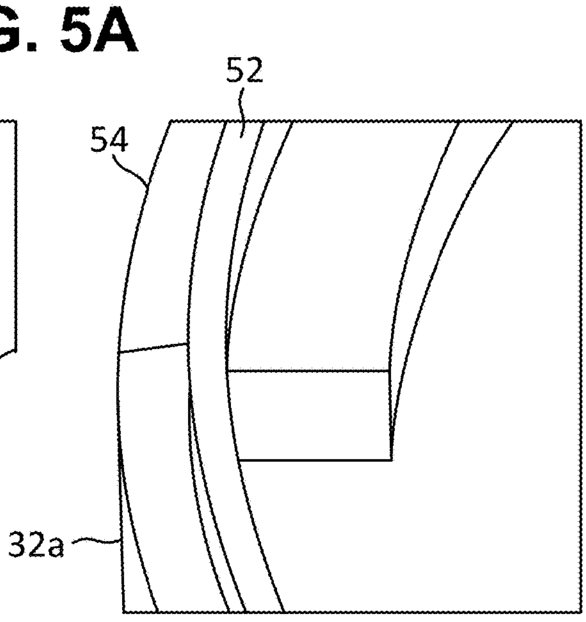
FIG. 5B
FIG. 5C

RETORT WITH LOADING WINDOW

TECHNICAL FIELD

The present disclosure relates to high temperature furnaces and retort assemblies for use in high-temperature furnaces.

BACKGROUND

High-temperature processing of ceramic matrix composite (CMC) parts such as melt infiltration, chemical vapor infiltration, and chemical vapor deposition are often performed using a furnace. In some cases, rather than loading parts directly into a furnace for processing, parts are loaded into a retort before the retort is loaded into a furnace for processing. A retort device may be alternatively called a loading fixture. A retort device supports parts for processing in a furnace and withstands the harsh furnace environment, which may include extreme temperatures, reactant gases, and pressures above or below atmospheric pressure.

SUMMARY

In some examples, the disclosure is directed to a multilevel retort assembly comprising: a base defining a base perimeter; a plurality of shells, each shell having a diffuser plate support and a perimeter with a substantially similar shape as the base perimeter, wherein the plurality of shells are stacked on each other, mechanically supported by the base, and surround an inner retort volume, and wherein at least one shell of the plurality of shells defines a removable window; and a plurality of diffuser plates, each diffuser plate supported by a corresponding diffuser plate support of the plurality of diffuser plate supports.

In some examples, the disclosure is directed to a method of processing parts in a furnace comprising: removing a removable window from at least one shell of a multilevel retort assembly, wherein the multilevel retort assembly comprises a base defining a base perimeter, a plurality of shells, each shell having a diffuser plate support and a perimeter with a substantially similar shape as the base perimeter, wherein the plurality of shells are stacked on each other, mechanically supported by the base, and surround an inner retort volume, and wherein at least one shell of the plurality of shells defines a removable window; loading one or more parts into the inner retort volume of the multilevel retort assembly through the removable window such that the one or more parts are supported by one or more plate of a plurality of diffuser plates, wherein each diffuser plate is supported by a corresponding diffuser plate support; and securing the removable window of the multilevel retort assembly to the at least one shell of the plurality of shells.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5A is a perspective view illustrating an example shell of a multilevel retort assembly, in accordance with some examples of the present disclosure.

FIG. 5B is a close-up perspective view of the example shell of FIG. 5A with the removable window removed, in accordance with some examples of the present disclosure.

FIG. 5C is a close-up perspective view of the example shell of FIG. 5A with the removable window secured in place, in accordance with some examples of the present disclosure.

Like symbols in the drawings indicate like elements.

DETAILED DESCRIPTION

Figure 1:
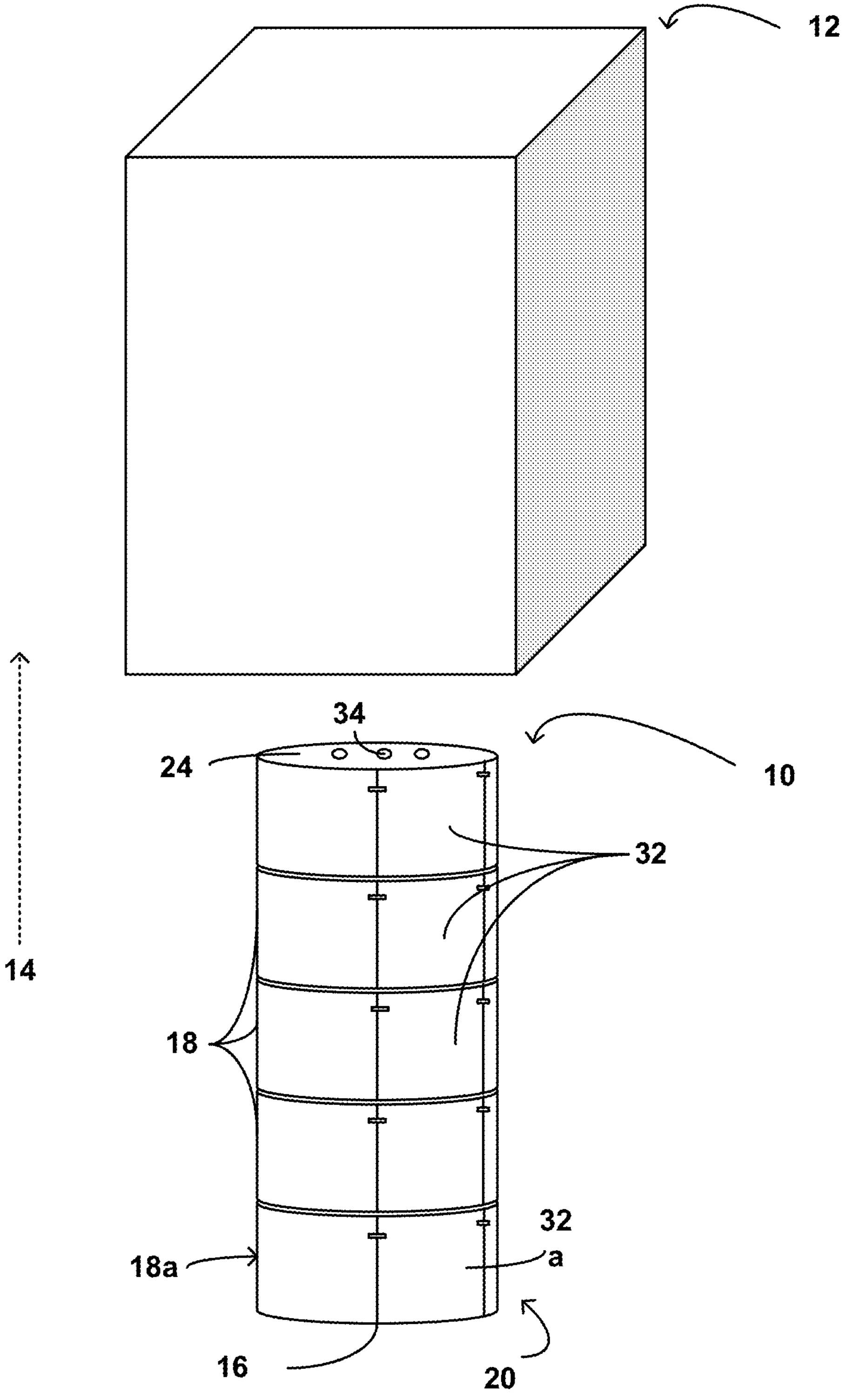
FIG. 1 is a schematic perspective view illustrating an example multilevel retort assembly and furnace, in accordance with some examples of the present disclosure.

Retort devices are used in the manufacturing of articles, such as ceramic matrix composite (CMC) parts, at high temperatures. Rather than load parts directly into a furnace, a retort device may be loaded with parts for processing in a furnace, and the loaded retort placed in the furnace. In this way, retort devices may improve furnace uptime in industrial operations by allowing for loading and unloading of parts outside of the furnace, thus reducing the time spent waiting for the furnace to cool down for loading and unloading. Further, in some processes, retort devices assist in processing material by containing reactant gases inside the retort device while inert guard gases flow around the outside of the retort device. In some implementations, a retort device can additionally or alternatively act as a pressure vessel within the furnace. In some examples, pressure inside the retort in an inner retort volume is reduced to below atmospheric pressure to operate the furnace as a vacuum furnace.

In some examples, high temperature processing of parts including melt infiltration (MI), chemical vapor infiltration (CVI), chemical vapor deposition (CVD), and/or heat treatment steps, may use a multilevel retort assembly according to the present disclosure. In these and other processes, a retort which is substantially gas tight (gas tight or nearly gas tight) may be used, so that interaction between process gases in the retort device and the parts being processed can be controlled. A substantially gas tight retort is a retort that allows inert gases flowing outside the retort to slowly leak into the retort, while reducing or substantially preventing process gases within the multilevel retort assembly from flowing out of the retort. In some implementations, a multilevel retort assembly according to the present disclosure may provide a substantially gas tight inner retort volume.

Since processing MI, CVI, and/or CVD of parts uses extensive input of raw materials and energy, it may be desirable to process many parts in parallel. For example, a plurality of parts may be loaded in a retort for a single batch process in a furnace, to improve part processing throughput. Some retort assemblies according to the present disclosure may allow for efficient use of available furnace space by including multiple levels to support parts within the retort assembly.

One way to use relatively more of the available volume in a furnace than a single level retort may allow is to include multiple levels that may mechanically support parts within an inner retort volume. Some multilevel retorts include a retort assembly which includes a plurality of shells or rings in a vertical direction. Inside the inner retort volume, and separate from the outer shell structure, a part-supporting scaffold may mechanically support parts on diffuser plates, which rest on standoff rods extending from the diffuser plate below. In multilevel retort assemblies of this type, the retort assembly must be completely disassembled between batches to load or unload parts. The shells or rings require lifting and removal, which may be unsafe or ergonomically problematic due to the size and weight of these structures.

In example multilevel retort assemblies according to the present disclosure, the multilevel retort assembly may be loaded and unloaded without disassembling the shells, which may reduce loading and unloading time and/or provide for safer and more ergonomic loading and unloading of the retort. For instance, multilevel retort assemblies according to the present disclosure include at least one removable window which provides access to at least one level of the multilevel retort assembly, allowing for loading and unloading of parts without disassembly of the multilevel retort assembly. This may allow for time savings over loading or unloading a conventional multilevel retort assembly. For example, a conventional multilevel retort assembly may take approximately 60 to 90 minutes to load and unload. In contrast, a multilevel retort assembly according to the present disclosure may be loaded and unloaded in about 15 minutes. Additionally, or alternatively, multilevel retort assemblies according to the present disclosure provide increased capacity for parts by removing internal support structures, which consume space in the inner retort volume that could otherwise be used for parts.

FIG. 1 is a schematic perspective view illustrating multilevel retort assembly 10 and furnace 12 according to the present disclosure. Multilevel retort assembly 10 is loaded into a working zone (not shown) of furnace 12. In the illustrated example, furnace 12 is a bottom-loaded furnace, meaning that multilevel retort assembly is lifted vertically in the direction of arrow 14 into the working zone of furnace 12. In other examples, furnace 12 may be top-loaded, and multilevel retort assembly 10 may be lowered into the furnace 12. In still other examples, furnace 12 may be a side-load furnace, and multilevel retort assembly 10 may loaded into furnace 12 horizontally. Furnace 12 may be used to perform any one or more of techniques on parts housed within retort 10, including, for example, melt infiltration, chemical vapor deposition, chemical vapor infiltration, heat treatments, or the like.

Figure 2:
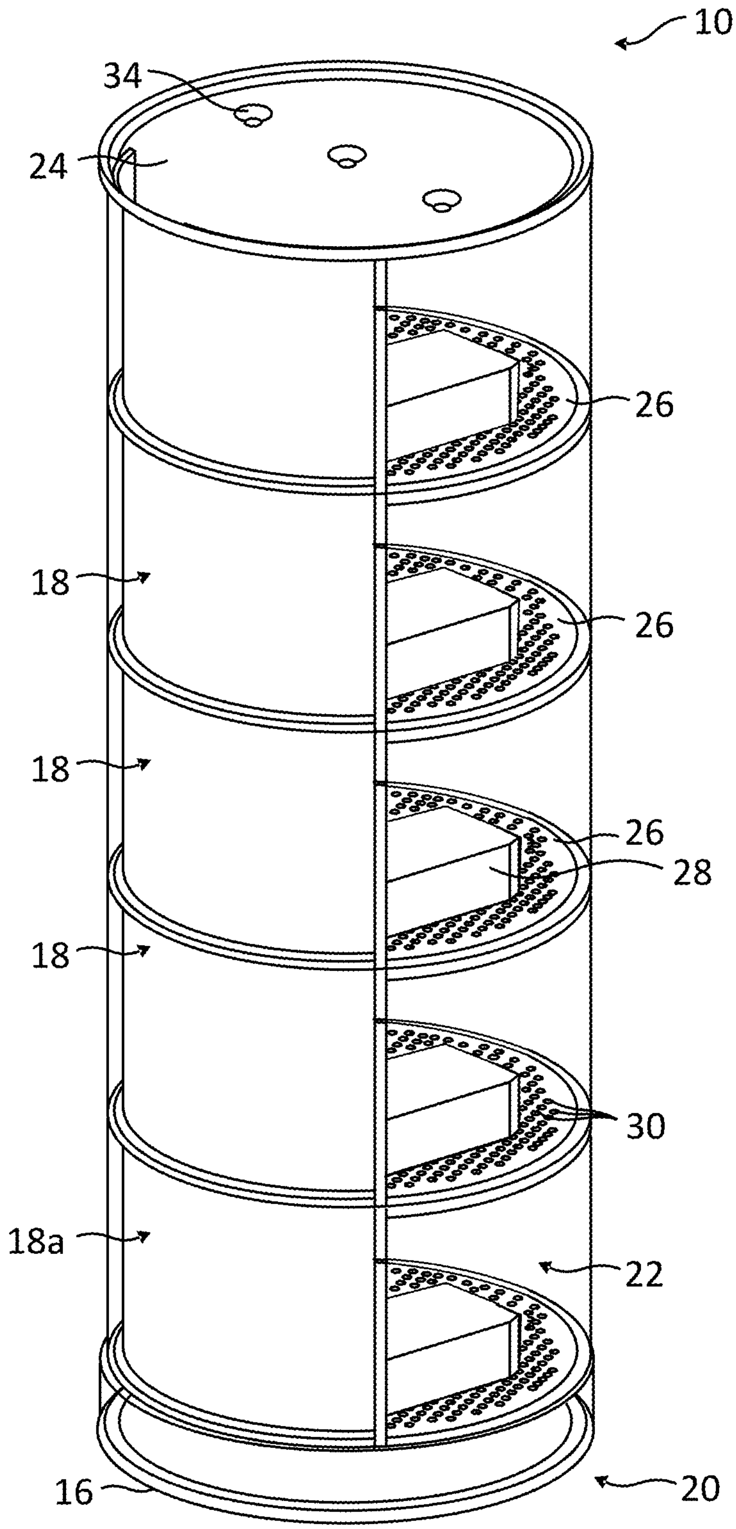
FIG. 2 is a perspective view illustrating an example multilevel retort assembly, in accordance with some examples of the present disclosure.

Referring to FIGS. 1 and 2, multilevel retort assembly 10 includes a base 16, a plurality of shells 18, and a cover 24. Base 16 defines the bottom of multilevel retort assembly 10 and mechanically supports the plurality of shells 18. Base 16 defines a base perimeter 20. In the illustrated example, base perimeter 20 defines a substantially circular shape. However, base perimeter 20 may be any geometric shape, including an ellipse or oval, a rectangle, or another polygonal or curvilinear shape. In some examples, the shape and size of base perimeter 20 is selected to fit within the opening in furnace 12.

Each shell of plurality of shells 18 may have a perimeter shaped and sized substantially similar to or the same as base perimeter 20. For instance, in the illustrated example, base perimeter 20 defines a substantially circular shape and each shell of plurality of shells 18 defines a substantially cylindrical shape with the same diameter when multilevel retort assembly 10 is assembled. In some examples, a bottom surface of first shell **18*a* may be base 16, and first shell 18*a* may define base perimeter 20. In other words, in some examples, first shell 18*a* may be integral with the base 16. In other examples, first shell 18*a* is separate from base 16. Shells 18 also may be referred to as rings 18**.

In some examples, each individual shell of the plurality of shells 18 may have substantially the same dimensions and be interchangeable with each other shell of plurality of shells 18. For purposes of discussion, a first shell **18*a* is labelled in FIGS. 1 and 2 and will be discussed as representative of shells 18**.

First shell **18*a* may form a hollow structure with a cross-sectional shape and size substantially the same as the shape and size of base perimeter 20. In the illustrated example, first shell 18*a* is substantially a hollow cylinder. Plurality of shells 18 may be arranged vertically on base 16 to define inner retort volume 22. Plurality of shells 18 may fit together and be topped with cover 24 to define inner retort volume 22. In some implementations, base 16, plurality of shells 18, and cover 24 form a substantially gas tight multilevel retort assembly 10. While furnace 12 is in operation, guard gases may flow around multilevel retort assembly 10, slowly leaking or diffusing into inner retort volume 22**.

Plurality of shells 18 may be stacked on each other and supported by base 16. In some examples, plurality of shells 18 are stacked on each other vertically, meaning plurality of shells 18 fit together and are arranged to support each other in a vertical direction, defining multilevel retort assembly 10. In some examples, plurality of shells 18 may be assembled horizontally, fitting together in a horizontal direction to define multilevel retort assembly 10.

Multilevel retort assembly 10 also includes a plurality of diffuser plates 26. Plurality of diffuser plates 26 function as mechanical support supporting parts 28 within inner retort volume 22. Multilevel retort assembly 10 may include any suitable number of diffuser plates 26 and spacing between adjacent diffuser plates 26 may be selected based on the size (e.g., height) of parts 28. In some examples, multilevel retort assembly 10 may include one diffuser plate for each shell of shells 18.

Although not labelled in FIGS. 1 and 2, the interior surface of shell **18*a* facing inner retort volume 22 may define, a diffuser plate support. The diffuser plate support may extend into inner retort volume 22 to mechanically support a corresponding diffuser plate 26. Each shell of plurality of shells 18 may include at least one diffuser plate support mechanically supporting a corresponding at least one diffuser plate, such that multilevel retort assembly 10 includes a plurality of diffuser plates 26. Each individual diffuser plate of the plurality of diffuser plates 26** may be interchangeable with any other individual diffuser plate.

Each individual diffuser plate of plurality of diffuser plates 26 may define a level of multilevel retort assembly 10. Each level of the multilevel retort assembly 10 may mechanically support one or more parts 28 during heat treatment.

Each diffuser plate 26 may define plurality of apertures 30. Plurality of apertures 30 may be gaps, holes, spaces, slots, or the like in diffuser plate 26 which allow gases in inner retort volume 22 to pass from one level to another. In some examples, diffuser plate 26 defines plurality of apertures 30 that are substantially evenly distributed across the diffuser plate 26.

At least one shell of plurality of shells 18 includes a removable window 32*a*. In the illustrated example of FIG. 1, each shell of the plurality of shells 18 includes a removable window, such that multilevel retort assembly 10 includes plurality of removable windows 32. In some examples, each removable window of removable windows 32 may be substantially identical. Removable window 32*a* will be discussed herein as an example of removable windows 32.

Removable window 32*a* may be removed from the remaining portion of shell 18*a*, as illustrated in FIG. 2, to allow for loading parts 28 on at least one level of multilevel retort assembly 10. Removable window 32*a* may define any portion (e.g., arc length) of first shell 18*a* large enough to accommodate loading one or more parts 28 from the side of multilevel retort assembly 10. In this way, parts 28 are loaded and unloaded from inner retort volume 22 through removable window 32*a* of at least one shell, such as first shell 18*a*, rather than from a top or bottom or a multilevel retort assembly or by assembling plurality of shells 18 around a scaffold supporting parts. Removable window 32*a* may be as large as desired, so long as when removable window 32*a* is removed, first shell 18*a* still can support the shells above it. As such, removable window 32*a* may have a length less than half of the perimeter (e.g., circumference) of first shell 18*a*. For example, removable window 32*a* may have a length (in the direction of the perimeter of first shell 18*a*) of between about 5% and about 45% of the perimeter of first shell 18*a*, such as between about 15% and about 35% of the perimeter of first shell 18*a*. In some examples, a height of removable window 32*a* may be made as large as possible (e.g., equal to a height of shell 18*a*) to allow for arrangement of one or more parts 28 on diffuser plate 26.

In some examples, removable window 32*a* may not be completely removed from first shell 18*a* but rather configured to swing open like a door by inclusion of a hinge or other mechanism.

Cover 24 may define at least one aperture 34 that allows gases to enter inner retort volume 22. Cover 24 may otherwise seal multilevel retort assembly 10 so that multilevel retort assembly is substantially gas tight. At least one aperture 34 may be a circular aperture. At least one aperture 34 may include three separate apertures defined by cover 24.

Figure 3:
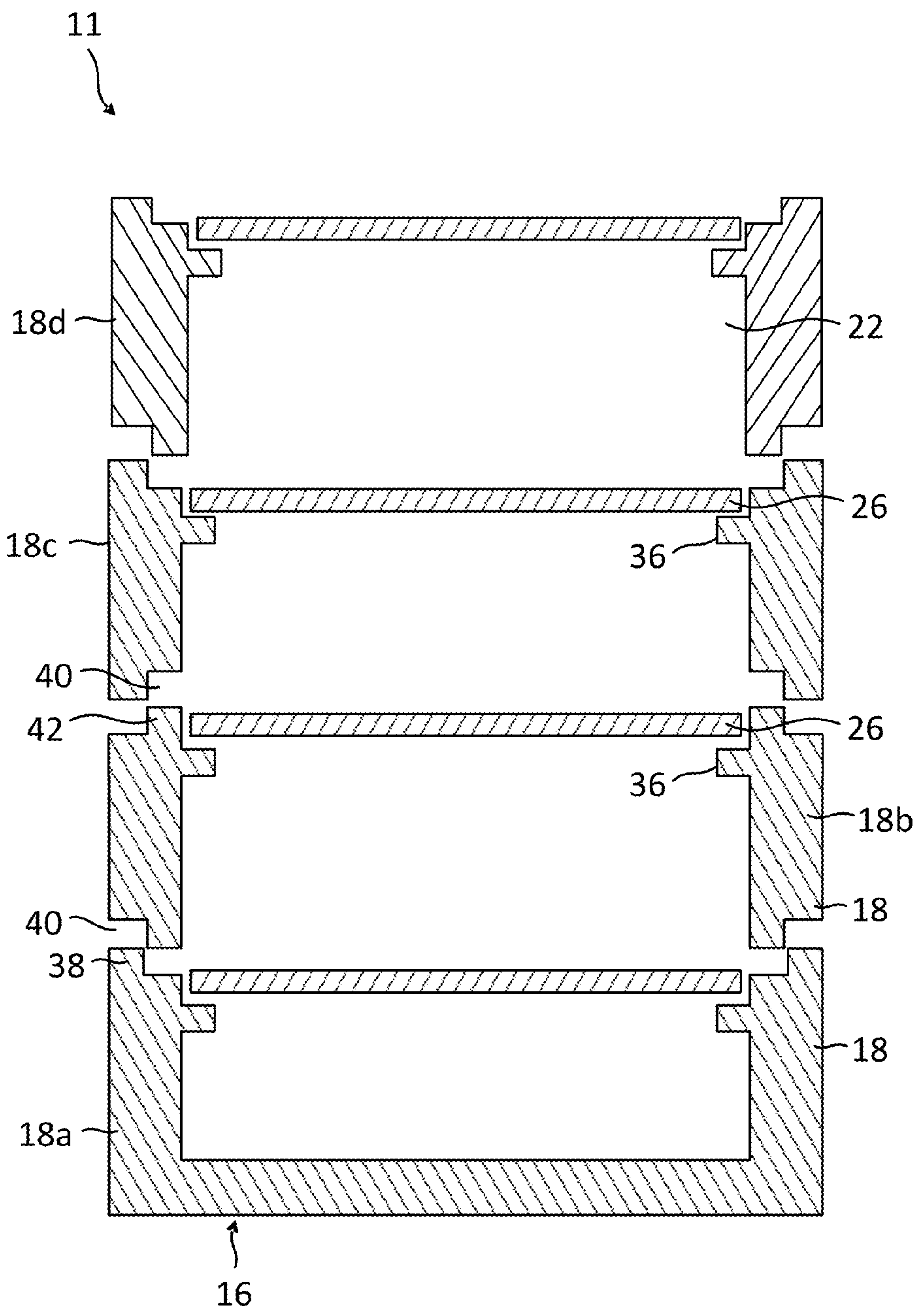
FIG. 3 is an exploded cross section illustrating an example multilevel retort assembly, in accordance with some examples of the present disclosure.

FIG. 3 illustrates a partially exploded cross-sectional view of a portion of an example multilevel retort assembly 11. Multilevel retort assembly 11 may be an example of multilevel retort assembly 10 of FIGS. 1 and 2. Multilevel retort assembly 11 includes plurality of shells 18 including first shell 18*a*, second shell 18*b*, third shell 18*c*, and fourth shell 18*d*. In the illustrated example, base 16 is integral with first shell 18*a*, meaning that base 16 and first shell 18*a* are made from a single piece of material. In other examples, base 16 and first shell 18*a* may be separate. In the example shown in FIG. 3, different shells 18 have different shapes. For instance, third and fourth shells 18*c* and 18*d* are substantially identical, but second shell 18*b* is different from third and fourth shells 18*c* and 18*d*, and first shell 18*a* is different from the other shells at least by virtue of being integral with base 16.

Multilevel retort assembly 10 includes plurality of diffuser plates 26, two of which are labelled in FIG. 3. Each diffuser plate of plurality of diffuser plates 26 is supported by a corresponding diffuser plate support 36, two of which are labelled in FIG. 3.

Each diffuser plate support of plurality of diffuser plate supports 36 functions to support a diffuser plate of plurality of diffuser plates 26, which function to support a load (e.g., parts 28 shown in FIG. 2) during heat treatment in a furnace (e.g., furnace 12 as shown in FIG. 1). In some examples, diffuser plate support 36 may be a radially inwardly extending lip, which is a shelf extending from the interior of a shell of shells 18 into inner retort volume 22. In some examples, diffuser plate supports 36 may be a lip or a shelf extending substantially around the entire inner circumference of the shell of plurality of shells 18. In other examples, diffuser plate support 36 may extend along an arc less than the full inner circumference of the shell of plurality of shells 18. In some examples, diffuser plate support 36 may be integral with the shell from which it extends.

In some examples, removable window 32 (not shown in FIG. 3) may define a portion of diffuser plate support 36, so that diffuser plate support 36 extends along the entire inner circumference (or perimeter) of the shell. In other examples, the surface of removable window 32 facing inner retort volume 22 omit diffuser plate support 36.

In some examples, multilevel retort assembly 10 may include an arrangement in which plurality of shells 18 are stacked on each other by fitting at least one protrusion 38 extending from a surface of a first shell 18*a* of plurality of shells 18 with a depression 40 in a corresponding surface of a second shell 18*b* of plurality of shells 18. In some examples, the surface of the first shell 18*a* may be the top surface, and the corresponding surface of second shell 18*b* may be a bottom surface. At least one protrusion 38 may extend vertically from any portion of the top surface of first shell 18*a*, such as a radially outer portion of a top surface of first shell 18*a*. Similarly, depression 40 may be defined at any corresponding portion of the bottom surface of second shell 18*b*, such as a radially outer portion of bottom surface of second shell 18*b*. The radially inner portion of a shell 18 may be defined as a portion that is closer to inner retort volume 22 than it is to the surroundings of multilevel retort assembly 10. Similarly, the radially outer portion of a shell 18 may be defined as a portion that is closer to the surroundings of multilevel retort assembly 10 than it is to inner retort volume 22. This allows protrusion 38 to mate with depression 40 and radially restrain first shell 18*a* and second shell 18*b* relative to each other. In other implementations, protrusion 38 may be at a radially outer portion of the top surface of first shell 18*a* and depression may be at a radially outer portion of the bottom surface of second shell 18*b*, or protrusion 38 and depression 40 may be at a radially middle portion of the top and bottom surfaces, respectively. Generally, protrusion 38 and depression 40 at any radially corresponding location of the top and bottom surfaces such that their positions are complementary and they engage when first shell 18*a* and second shell 18*b* are stacked.

Similarly, in some examples, second shell 18*b* includes at least one protrusion 42 extending from a top surface of second shell 18*b* and third shell 18*c* includes a corresponding depression 44 in a bottom surface of third shell 18*c* of plurality of shells 18. At least one protrusion 42 extends from a top surface of second shell 18*b* into corresponding depression 44 in third shell 18*c*. In some implementations, as each shell 18 is substantially identical, the position of the protrusions and depressions may be similarly substantially identical, such that shells 18 may be stacked on each other in any order.

Figure 4A:
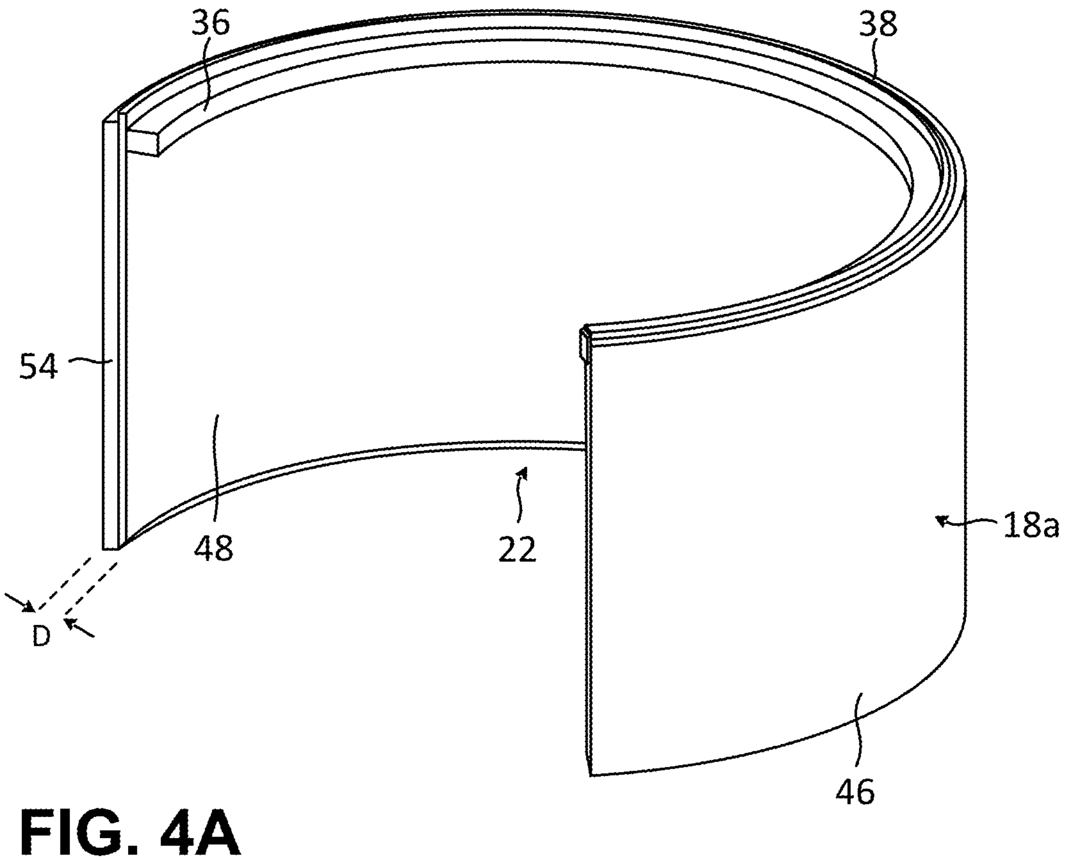
FIG. 4A is a perspective view of an example shell of a multilevel retort assembly including a removable window which is removed, in accordance with some examples of the present disclosure.
Figure 4B:
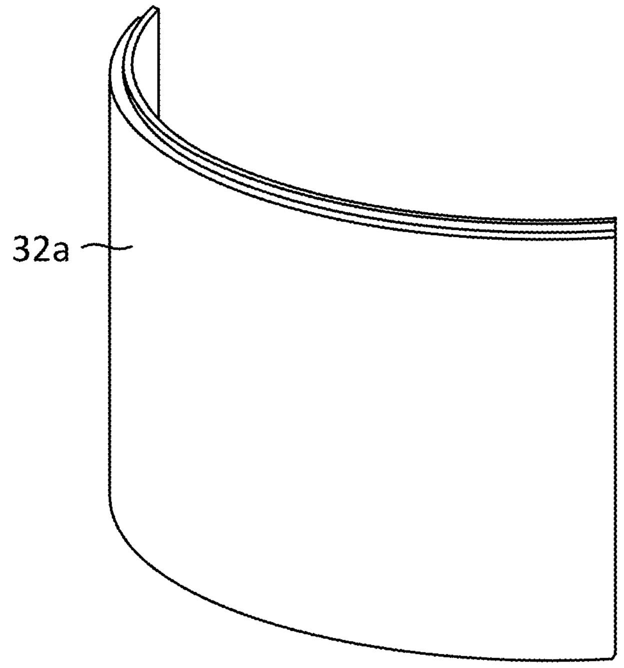
FIG. 4B is a perspective view illustrating an example removable window for the shell of FIG. 4A, in accordance with some examples of the present disclosure.

As mentioned above, shells 18 may include a removable window and a diffuser plate support. FIGS. 4A and 4B illustrate perspective views of an example of first shell 18*a*, which includes a body portion 54 and an example removable window 32*a*. Body portion 54 of first shell 18*a* includes diffuser plate support 36 on inner surface 48 of body portion 54. Diffuser plate support 36 may be a shelf or protrusion extending into inner retort volume 22 from inner surface 48. Diffuser plate support 36 may be continuous in the circumferential direction, as shown in FIG. 4A, or may be discontinuous (e.g., may include a plurality of discrete protrusions or shelves with gaps between them in the circumferential direction).

Removable window 32*a* defines a portion of the perimeter of first shell 18*a*. In the example shown in FIG. 4B, removable window 32*a* does not include a diffuser plate support 36. In other examples, removable window 32*a* may include a diffuser plate support 36.

Body portion 54 of first shell 18*a* has an outer surface 46 facing the surroundings of the retort assembly and an inner surface 48 facing inner retort volume 22, and inner surface 48 and outer surface 46 are separated by an approximately equal distance D at any point on outer surface 46, such that the radial thickness of shell 18*a* at a given height is substantially constant.

FIGS. 5A-5C illustrate further details of body portion 54 of first shell 18*a* and removable window 32*a* from a perspective view. FIG. 5B illustrates a close-up view of first shell 18*a* with removable window 32*a* removed. FIG. 5C illustrates a close-up view illustrating body portion 54 with removable window 32*a* secured in place. In some examples, removable window 32*a* may be secured in place without additional components or features. In other words, removable window 32*a* may be secured in place only by fitting removable window 32*a* adjacent to body portion 54. Body portion 54 and removable window 32*a* may be configured to contact at interface 52. Body portion 54 may define interface surface 50. In some examples, interface surface 50 may be smooth to help form a substantially gas-tight seal between body portion 54 and removable window 32*a*. In some examples, interface surface 50 may include alignment or locating features such as grooves, alignment posts, alignment features, or the like to help position removable window 32*a* relative to body portion 54.

Figure 6A:
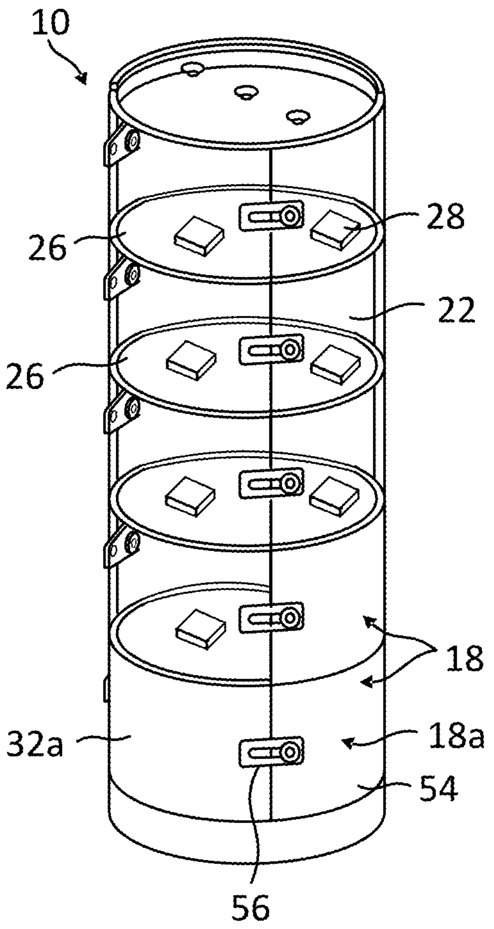
FIG. 6A is a perspective view of an example multilevel retort assembly that includes an example retaining strap feature, in accordance with some examples of the present disclosure.

FIG. 6A illustrates a perspective view of another example of multilevel retort assembly 10. Multilevel retort assembly 10 may be substantially the same as described with respect to FIG. 2, aside from the differences described below. Some shells of plurality of shells 18 are not illustrated in FIG. 6A so that inner retort volume 22 can be better seen, showing plurality of diffuser plates 26 supporting parts 28 for heat treatment. Parts 28 shown in FIG. 6A have a different size and shape compared to parts 28 shown in FIG. 2.

Body portion 54 of first shell 18*a* may include at least one retaining strap 56 configured to secure removable window 32*a* to body portion 54 of first shell 18*a*. In some examples, at least one retaining strap 56 may be a releasable coupling configured to controllable secure and release removable window 32*a* and body portion 54. In some examples, at least one retaining strap feature 56 may wrap all the way around the outer perimeter of body portion 54. In other examples, as shown in FIG. 6A, at least one retaining strap feature 56 extends only a relatively short portion around first shell 18*a*. In some examples, each shell of plurality of shells 18 defines a corresponding removable window 32, and each removable window 32 is secured to the corresponding shell of plurality of shells 18 by at least one corresponding retaining strap feature 56.

Figure 6B:
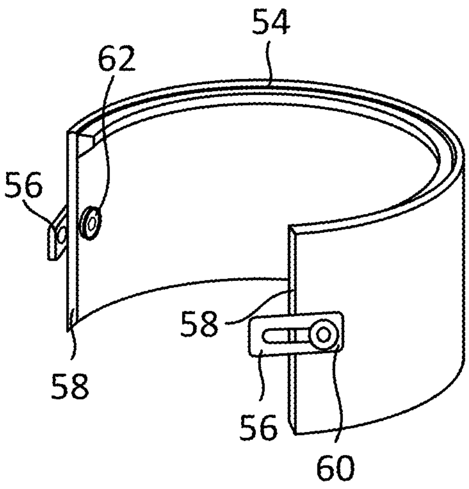
FIG. 6B is a perspective view of an example shell of the multilevel retort assembly of FIG. 6A fitted with two retaining strap features, in accordance with some examples of the present disclosure.

FIG. 6B illustrates body portion 54 of first shell 18*a*. In some examples, removable window 32*a* may be secured to the shell by at least one retaining strap feature 56 on each opposing side of a pair of opposing sides of body portion 54 of first shell 18*a*. In the illustrated example of FIG. 6B, the pair of opposing sides 58 of body portion 54 of first shell 18*a* are circumferentially displaced from each other. In some examples, the pair of opposing sides 58 may additionally or alternatively be vertically displaced from each other.

FIG. 6B also illustrates an external nut 60 and an internal nut 62. Corresponding pairs of internal nut 62 and external nut 60 cooperate to hold each at least one retaining strap feature 56 to body portion 54. In other examples, other retaining mechanisms may be used to attach at least one retaining strap feature 56 to body portion 54.

Figure 6C:
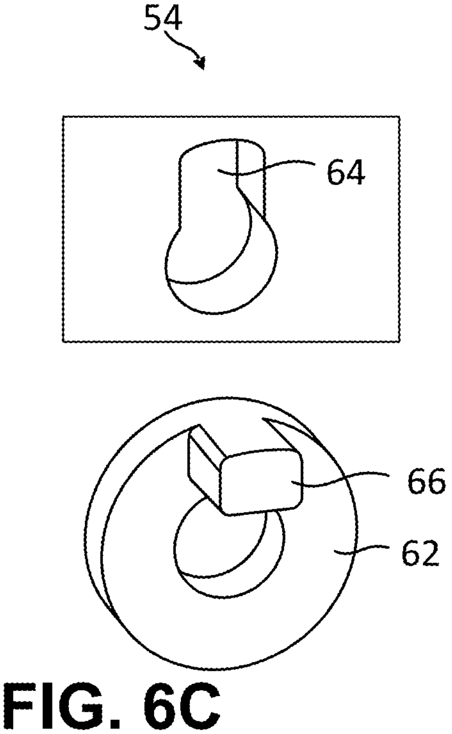
FIG. 6C is a perspective view illustrating an example key-slot design of an example retaining strap according to the present disclosure, in accordance with some examples of the present disclosure.

FIG. 6C illustrates is an exploded view of a part of body portion 54 and internal nut 62 illustrated in FIGS. 6A and 6B. In some examples, multilevel retort assembly 10 may include at least one keyed aperture 64, which is shaped to engage a key feature 66 of internal nut 62. This may allow tightening and loosening of external nut 60 without internal nut 62 free spinning.

Figure 7A:
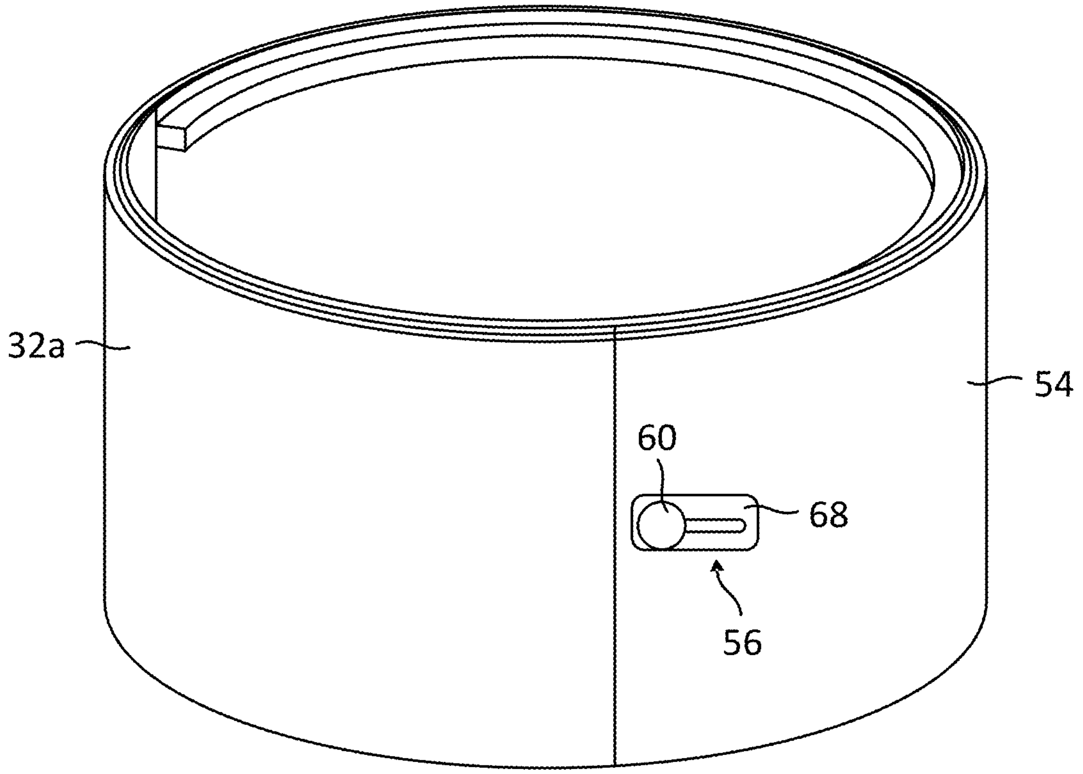
FIG. 7A is a perspective view illustrating an example shell of a multilevel retort assembly with an example retaining strap in the open position, in accordance with some examples of the present disclosure.
Figure 7B:
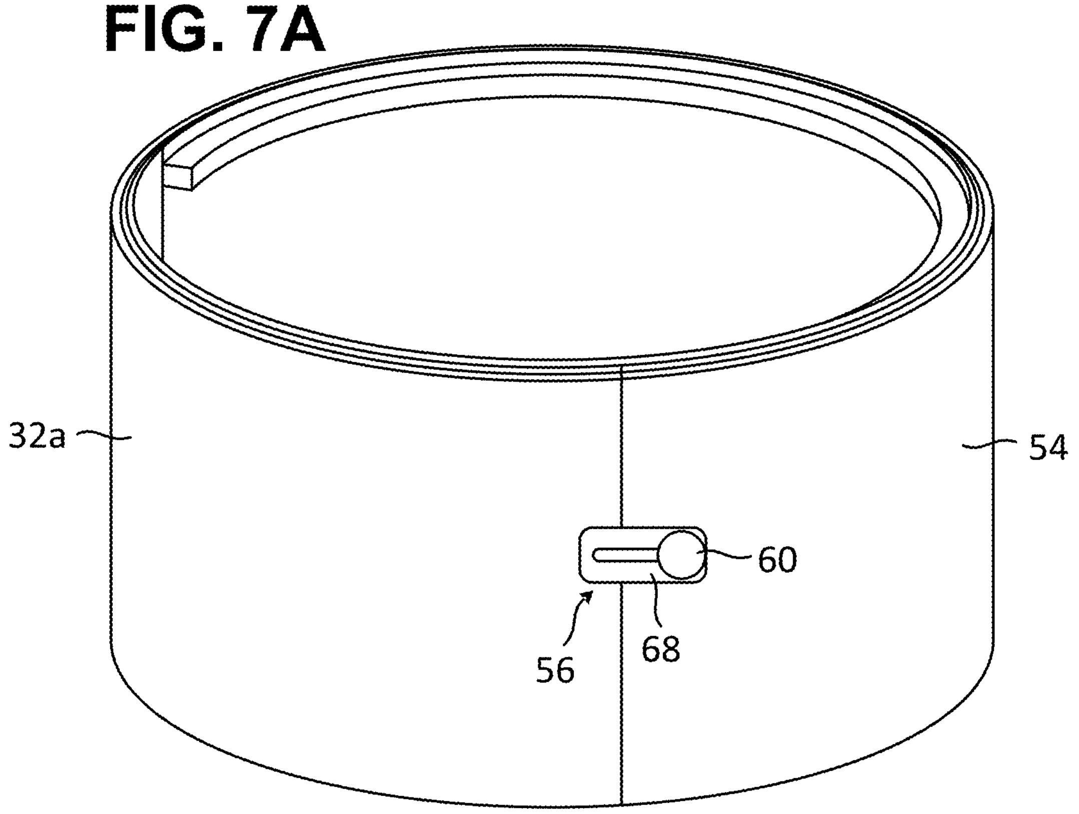
FIG. 7B is a perspective view illustrating the example shell of a multilevel retort assembly of FIG. 7A with the example retaining strap in the closed position, in accordance with some examples of the present disclosure.

FIGS. 7A and 7B illustrate an example body portion 54 and removable window 32*a* of first shell 18*a*. In some examples, first shell 18*a* may include at least one retaining strap feature 56 configured to secure removable window 32*a* into place. At least one retaining strap feature 56 may be attached to body portion 54, e.g., by internal nut 62 and external nut 60. At least one retaining strap feature 56 may further include slidable strap 68. FIG. 7A illustrates at least one retaining strap feature 56 in an open position. In the open position, slidable arm 68 of at least one retaining strap feature 56 does not overlap removable window 32*a*. In an open position, slidable arm 68 may allow removable window 32*a* to be removed from first shell 18*a*.

FIG. 7B illustrates at least one retaining strap feature 56 in a closed position. In a closed position, slidable arm 68 of at least one retaining strap feature 56 overlaps removable window 32*a*, securing removable window 32*a* to body portion 54 of first shell 18*a*. In some examples, at least one retaining strap feature 56 may be changed between the open and the closed positions by loosening external nut 60 by turning external nut, sliding slidable arm 68 in the desired open or closed direction, and then tightening external nut 60 by turning external nut 60. In some examples, at least one of external nut 60, internal nut 62, or slidable arm 68 comprises graphite. In this way, at least one retaining strap feature 56 may retain removable window 32*a* while allowing removable window 32*a* to be easily removed to load and unload parts from the retort.

Figure 8:
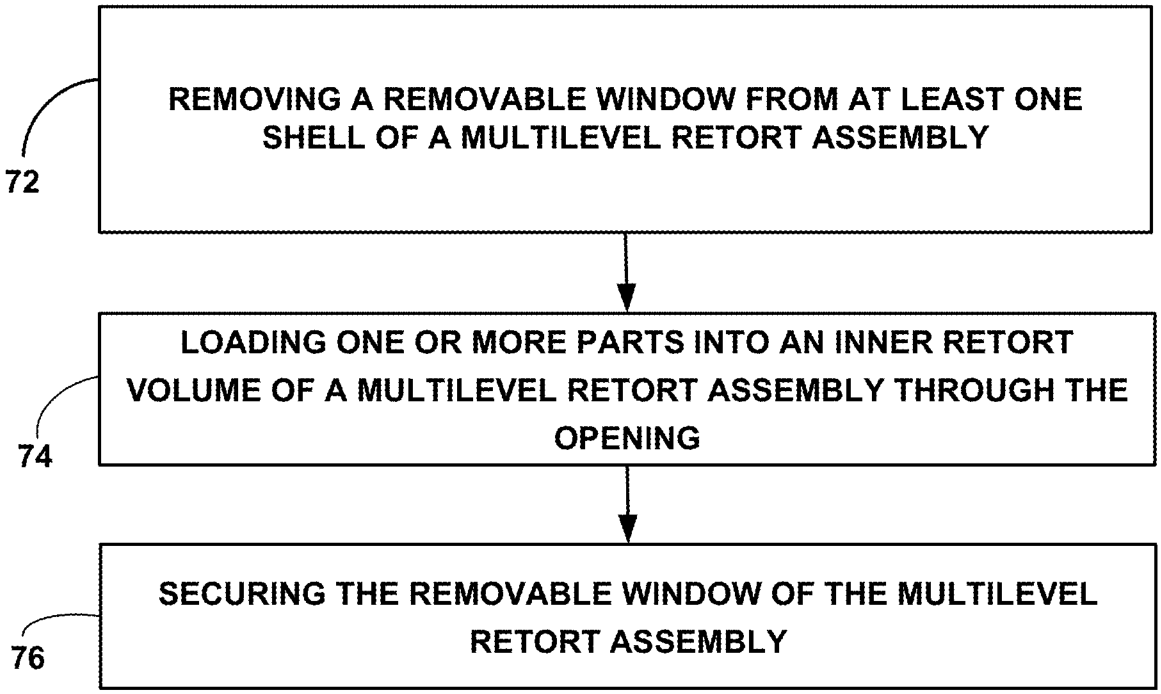
FIG. 8 is a flow diagram illustrating an example technique for loading a multilevel retort assembly, in accordance with some examples of the present disclosure.

FIG. 8 is a flowchart illustrating an example technique for processing parts in a retort in furnace according to the present disclosure. The technique of FIG. 8 includes removing a removable window 32*a* from at least one shell 18*a* of a multilevel retort assembly 10 (72). Removable window 32*a* may be removed from at least one shell 18*a* of multilevel retort assembly 10 by loosening external nut 60, sliding slidable arm 68 into an open position, and removing removable window 32*a*.

In some examples, removing removable window 32*a* from at least one shell 18*a* of multilevel retort assembly 10 may removing all removable windows 32 all shells 18 of the multilevel retort assembly 10.

The technique of FIG. 8 also includes loading one or more parts 28 into an inner retort volume 22 of multilevel retort assembly 10 through the opening left by removal of removable window 32*a* (74). One or more parts 28 may be loaded into the inner retort volume 22 such that one or more parts 28 are supported by one or more corresponding diffuser plates 26. Each diffuser plate 26 may be supported by a corresponding diffuser plate support 36.

The technique of FIG. 8 also includes securing removable window 32*a* of the multilevel retort assembly 10 to body portion 54 of at least one shell 18*a* (76). In some examples, removable window 32*a* may be secured to body portion 54 of at least one shell 18*a* using at least one retaining strap feature 54. Multilevel retort assembly 10 then may be loaded into furnace 12 for processing of parts 28. To unload parts 28 from multilevel retort assembly 10, a reverse procedure may be followed.

The invention claimed is:

1. A multilevel retort assembly comprising:
   - a base defining a base perimeter;
   - a plurality of shells, each shell having a diffuser plate support and an outer shell perimeter with a substantially similar shape as the base perimeter, wherein the plurality of shells are stacked on each other, mechanically supported by the base, and surround an inner retort volume, and wherein at least one shell of the plurality of shells defines a removable window, wherein the removable window is a portion of the outer shell for accommodating loading one or more parts from the side of the multilevel retort; and
   - a plurality of diffuser plates, each diffuser plate defining a plurality of apertures and each diffuser plate supported by a corresponding diffuser plate support of the plurality of diffuser plate supports.

2. The multilevel retort assembly of claim 1, wherein the base perimeter has a substantially circular shape, and wherein the multilevel retort assembly is substantially cylindrical.

3. The multilevel retort assembly of claim 1, wherein the removable window is between about 5% and about 45% of the outer shell perimeter.

4. The multilevel retort assembly of claim 1, wherein the removable window is secured to the multilevel retort assembly by at least one retaining strap feature.

5. The multilevel retort assembly of claim 4, wherein the removable window is secured to the shell by a respective retaining strap feature on each opposing side of a pair of opposing sides of the shell.

6. The multilevel retort assembly of claim 4, wherein the at least one retaining strap feature has a key-slot design to allow tightening and loosening of an external nut securing the retaining strap feature to the shell without free spinning of a bolt on which the external nut is threaded.

7. The multilevel retort assembly of claim 1, wherein each shell of the plurality of shells defines a corresponding removable window.

8. The multilevel retort assembly of claim 1, further comprising a cover defining at least one aperture allowing gases to enter the inner retort volume.

9. The multilevel retort assembly of claim 1, wherein at least one of the base, the plurality of shells, or the plurality of diffuser plates comprises graphite.

10. The multilevel retort assembly of claim 1, wherein the plurality of shells are stacked on each other by fitting at least one protrusion extending from a surface of a first shell of the plurality of shells with a depression in a corresponding surface of a second shell of the plurality of shells.

11. The multilevel retort assembly of claim 10, wherein
    - the surface of the first shell is the top surface, and the corresponding surface of the second shell is a bottom surface, and the at least one protrusion extends vertically from a radially outer portion of the first shell top surface into a depression in on a radially outer portion of the second shell bottom surface,
    - the second shell comprises at least one protrusion extending from a top surface of the second shell into a corresponding depression in a bottom surface of a third shell of the plurality of shells, and
    - the at least one protrusion extending from a top surface of the second shell into a corresponding depression in the third shell extends from a radially inner portion of the second shell top surface.

12. The multilevel retort assembly of claim 1, wherein each shell of the plurality of shells is substantially identical to each other shell of the plurality of shells.

13. The multilevel retort assembly of claim 1, wherein each shell of the plurality of shells has an outer surface facing surroundings of the retort assembly and an inner surface facing the inner retort volume, and wherein the inner surface and outer surface are separated by an approximately equal distance at any point on the outer surface, such that the shell thickness is substantially constant.

14. The multilevel retort assembly of claim 1, wherein the diffuser plate support comprises a radially inward extending lip.

15. The multilevel retort assembly of claim 1, wherein:
    - each diffuser plate of the plurality of diffuser plates is configured to support a load and define different levels of the multilevel retort assembly, and
    - each diffuser plate of the plurality of diffuser plates defines a corresponding plurality of apertures to allow reactant gases to pass from one level of the multilevel retort assembly to another level of the multilevel retort assembly.

16. The multilevel retort assembly of claim 1, wherein a first shell of the plurality of shells is integral with the base.

17. A method of processing parts in a furnace comprising:
    - removing a removable window from at least one shell of a multilevel retort assembly, wherein the multilevel retort assembly comprises a base defining a base perimeter, a plurality of shells, each shell having a diffuser plate support and an outer shell perimeter with a substantially similar shape as the base perimeter, wherein the plurality of shells are stacked on each other, mechanically supported by the base, and surround an inner retort volume, and wherein at least one shell of the plurality of shells defines a removable window, wherein the removable window is a portion of the outer shell for accommodating loading one or more parts from the side of the multilevel retort;
    - loading one or more parts into the inner retort volume of the multilevel retort assembly through the removable window such that the one or more parts are supported by one or more plate of a plurality of diffuser plates, wherein each diffuser plate defines a plurality of apertures and each diffuser plate is supported by a corresponding diffuser plate support; and securing the removable window of the multilevel retort assembly to the at least one shell of the plurality of shells.

18. The method of claim 17, wherein securing the removable window to the multilevel retort assembly comprises securing the removable window to the multilevel retort assembly using at least one retaining strap feature.

19. The method of claim 17, wherein removing the removable window from at least one shell of the multilevel retort assembly further comprises removing a removable window from each corresponding shell of the plurality of shells, wherein each shell of the plurality of shells defines a corresponding removable window.

* * * * *